United States Patent
Heegard et al.

(10) Patent No.: US 7,227,949 B2
(45) Date of Patent: Jun. 5, 2007

(54) SEPARATE SELF-SYNCHRONIZING PACKET-BASED SCRAMBLER HAVING REPLAY VARIATION

(75) Inventors: Chris Heegard, Key West, FL (US); Richard G. C. Williams, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 851 days.

(21) Appl. No.: 10/355,676

(22) Filed: Jan. 30, 2003

(65) Prior Publication Data

US 2003/0145196 A1 Jul. 31, 2003

Related U.S. Application Data

(60) Provisional application No. 60/353,529, filed on Jan. 31, 2002.

(51) Int. Cl.
 *L04L 9/00* (2006.01)
(52) U.S. Cl. .................. 380/37; 380/210; 380/274; 380/268
(58) Field of Classification Search ............... 380/274, 380/208, 210, 268, 37
 See application file for complete search history.

(56) References Cited

U.S. PATENT DOCUMENTS

| | | | | |
|---|---|---|---|---|
| 4,268,720 A | | 5/1981 | Olberg et al. ............ | 179/1.5 R |
| 4,383,322 A | * | 5/1983 | Halpern et al. ............ | 375/141 |
| 5,086,470 A | | 2/1992 | Balance ................ | 380/48 |
| 5,233,629 A | | 8/1993 | Paik et al. .............. | 375/39 |
| 5,321,725 A | | 6/1994 | Paik et al. .............. | 375/39 |

(Continued)

OTHER PUBLICATIONS

"IR Parity Check Codes" Heegard et al, IEEE vol. 48, No. 7, Jul. 2000, pp. 1108-1113.

(Continued)

*Primary Examiner*—Kambiz Zand
*Assistant Examiner*—Tongoc Tran
(74) *Attorney, Agent, or Firm*—Steven A. Shaw; W. James Brady; Frederick J. Telecky, Jr.

(57) ABSTRACT

A separated synchronizing scrambler/descrambler pair that removes the possibility of catastrophic error due to improper transmission of initial condition information without disrupting the OFDM modulation scheme of a system that includes error-correction coding circuitry and replay variation. A transmitting device within the pair includes a first and a second data scrambler wherein the first data scrambler couples to receive the incoming data stream and filters the incoming data stream to provide a first filtered signal using a key signal. The second data scrambler, having an initial condition, couples to receive the first filtered signal and converts it into a scrambled signal using a scrambling seed. The second data scrambler comprises a random series generator for generating the scrambling seed to convert the first filtered signal into a scrambled signal. The scrambled signal is transmitted to the receiving device. A receiving device within the pair includes a first and a second data descrambler coupled together. The first data descrambler, having an initial condition equivalent to that of the second data scrambler, couples to receive the transmitted scrambled input data stream to convert it into a descrambled signal using a descrambling seed equivalent to the scrambling seed. The first data descrambler includes a random series generator for generating the descrambling seed. The second data descrambler couples to receive the descrambled signal and filters it to provide a filtered descrambled signal using a feedforward filter and a key signal. The feedforward filter is structured similar to the feedback filter.

21 Claims, 2 Drawing Sheets

U.S. PATENT DOCUMENTS

| | | | |
|---|---|---|---|
| 5,530,959 A | 6/1996 | Amrany | 380/48 |
| 5,598,228 A | 1/1997 | Saitoh | 348/732 |
| 5,663,981 A | 9/1997 | Takahashi | 375/208 |
| 5,703,887 A | 12/1997 | Heegard et al. | 371/42 |
| 5,745,522 A | 4/1998 | Heegard | 375/208 |
| 5,881,154 A | 3/1999 | Nohara et al. | 380/42 |
| 6,122,376 A | 9/2000 | Rao | 380/33 |
| 6,160,854 A | 12/2000 | Heegard et al. | 375/265 |
| 6,385,319 B1 | 5/2002 | Nyu | 380/274 |
| 6,952,480 B1 * | 10/2005 | Martin | 380/261 |

OTHER PUBLICATIONS

High Performance Wireless Ethernet, Heegard et al, IEEE Communications Magazine, Nov. 2001, pp. 64-73.

"Self Synchronizing Digital Scramblers", Arazi, IEEE vol. 25, No. 12, Dec. 1977.

* cited by examiner

SEPARATE SELF-SYNCHRONIZING PACKET-BASED SCRAMBLER HAVING REPLAY VARIATION

This application claims priority under 35 USC 119(e)(1) of provisional application Ser. No. 60/353,529, filed Jan. 31, 2002.

FIELD OF THE INVENTION

The present invention relates to data communication, and, more particularly, to a separate self-synchronizing packet-based scrambler having replay variation.

BACKGROUND OF THE INVENTION

Scrambling of digital signals is routinely used in data communications to ensure transitions in the received data signal and, thereby, avoid loss of synchronization in the data recovery process. Specifically, given a data communication system comprising synchronous modems, each modem conventionally includes both a transmitter and a receiver section. In principle, synchronous data communication comprises at least one transmitter of a first synchronous modem sending data to the receiver of the second synchronous modem and vice versa. The transmitter and receiver sections within the modem include a scrambler and a descrambler, respectively. Since the receiver clock is derived from the received data, the data must contain enough transitions from 0 to 1 (and vice versa) to ensure that the timing recovery circuit within the receiver stays in synchronization. Hence, the scrambler is used to change the input bit stream in a controlled way to guarantee that the data contains enough transitions.

There are numerous advantages of data scrambling which are found in large variety of communications systems and applications. In some communications systems, however, such as voice-band modems, constant data patterns may produce unwanted tones that reduce the ability of the receiver to synchronize the transmitted signal. Yet, in other communications systems, such as those including packet-based orthogonal frequency division modulation (OFDM) modems, certain data patterns can produce symbols with a large peak to average power (PAP) ratio which suffer more degradation; and therefore, are more susceptible to errors. As a result, the data packet may not be received by the receiver. Even though the packet is retransmitted, the large PAP ratio of the symbol within the packet causes a large error probability. Standard scrambling techniques are used to ensure that the transmitted data between the initial transmission and retransmission are uncorrelated. To achieve this, the scrambler uses a different seed or variation for every transmission, hence, the term replay variation. One example of replay variation may be to simply add one to the seed after every transmission. Further, the length of the scrambling sequence has to be in the order of the number of bits per OFDM symbol to guarantee uncorrelated PAP ratios for different seeds. Different scrambling in every transmission will guarantee independent PAP ratios for the OFDM symbols in retransmissions; and hence, independent error probabilities. Although, symbol scrambling does not guarantee a PAP ratio below some low level, it does decrease the probability that large PAP ratios occur.

There are two common methods for scrambling data: synchronized scrambling and self-synchronizing scrambling. In synchronized scrambling or block scrambling, a framing pattern or other known means is used to manipulate the bits into some definable blocks of information. These bits are then exclusively OR'ed with a fixed pattern of bits synchronized to the boundaries of the block. An example of a framing pattern may comprise a scrambling sequence generated from a pseudo random sequence generator wherein the data to be transmitted is altered by the addition of the scrambling sequence on a symbol-by-symbol basis. Specifically, the scrambling sequence a pseudo-random number (PN) sequence. The addition of the PN sequence to the incoming data stream is defined over a symbol set representing a finite field (FF). In the binary symbol representation, addition is defined using an exclusive-or (XOR) operation. Since a pattern of scrambling bits is fixed with respect to the block, the same pattern can be used at the receiving end to unscramble the bits. Thus, descrambling occurs at the receiving side using the PN sequence which was employed at the transmitting side. Any bit error occurring in the transmission channel between the transmitter and the receiver will cause an error in that particular bit, but will not cause other bits to be in error, provided only that the receiver remains synchronized with the transmitter given the block boundaries. Thus, synchronized scrambling is beneficial in that it does not propagate transmission errors. The requirement that the transmitted scrambling sequence and the received scrambling sequence be synchronized, however, proves to be a disadvantage. Particularly, in systems that allow replay variation, since replay variation entails that transmission of identical data on two separate occasions will likely result in different sequences of transmission symbols.

To avoid the requirement of synchronizing the transmitting and receiving sides of a synchronized scrambler, a self-synchronizing scrambler may be implemented. In self-synchronizing scrambling, the bits at the transmitting end of a communication channel to be scrambled are passed through a scrambling feedback filter structure at the transmitter. More particularly, the bits at the transmitting end of a communication channel to be scrambled are passed through one input of a two input exclusive OR gate. The output of the gate is the output of the scrambler and also the input to an N-stage shift register which provides the feedback filter structure. This shift register is tapped at the Nth stage and/or one or more other stages, and the outputs of these taps are exclusively OR'ed together. The result of this exclusive OR operation is applied to the other input of the exclusive OR gate that has the data to be scrambled as the first input. The tap positions are chosen such that a polynomial represented by the tap weight is irreducible. This is also known as a primitive polynomial. The scrambled bits received at the receiving end of the communication channel to be descrambled are passed through a descrambling feedforward filter structure at the receiver. More particularly, the bits at the receiving end of a communication channel to be descrambled are passed through one input of a two input exclusive OR gate. The bits at the receiving end of the communcation channel to be descrambled are also passed through an N-stage shift register which provides a feedforward filter structure. This shift register is tapped at the Nth stage and/or one or more other stages, and the outputs of these taps are exclusively OR'ed together. The tap positions of the N-stage shift register are chosen such that the tap weights represent the same primitive polynomial of the feedback filter structure at the transmitting end of the communication channel. The result of this exclusive OR operation is applied to the other input of the exclusive OR gate that has the data to be descrambled as the first input. The result of this exclusive OR provides the output of the descrambler.

The feedback and feedforward filters are typically linear, time-invariant filters over the FF. The descrambling filter is required to operate on a sliding window of the received symbol sequence. For a linear descrambling filter, the output at any given time is a linear combination of the received symbols within the sliding window. Such a filter is commonly known as a moving average or finite impulse response (FIR) filter. The feedback-free constraint of the descrambling filter implies that a transmission error can affect the descrambler output only during the time that the error is within the window of the filter. Thus, self-synchronizing scrambling provides limited error propagation in that the possibility exists that an error can affect the descrambler output while it is within the window of the filter. The length of the descrambling window, however, limits the span of the possible error propagation. Thereby, self-synchronizing scrambling is advantageous in that the limited effect of an error exists when the descrambling filter has knowledge of the state of the scrambling filter.

In frame or packet based communications systems, such as systems in compliance with IEEE Standard 802.11 and HiperLAN WLANs, information that is to be transmitted is sent in fixed or variable length blocks with boundaries that synchronize at the transmitter and receiver. Synchronized scramblers are used to perform packet synchronization processing and guarantee the synchronization of the scrambling sequence generators. In systems that provide replay variation, however, it is not best to use the synchronized scrambler as previously described.

In a self-synchronizing scrambler, replay variation is implemented by varying the initial condition or value of the state of the scrambling sequence generator at the beginning of the packet. In order to properly descramble the data at the receiver, the initial condition of the scrambling sequence generator must be conveyed to the receiver. As such, information about the initial condition used by the transmitter is transmitted as an extra part of the packet. An error, however, may occur in the transmission of the initial condition information. This can lead to un-bounded (i.e. catastrophic) error propagation that corrupts the entire packet. In a system where any detected error in a packet results in rejection of the entire packet, the catastrophic error propagation problem will not have an effect upon the reliability of data transmission. However, if the data is protected by an error-correcting code, such as a Reed-Solomon code, the catastrophic error propagation will usually overload the error correcting capabilities of the code and render the error-correction mechanism useless.

In an effort to prevent this condition, replacing the synchronized scrambler with a self-synchronizing scrambler may prove useful. Unfortunately, this approach requires a change to the OFDM modulation scheme, and hence, the entire communication system which may prove costly. Thus, this approach is not desirable.

Thus, a need exists for a scrambler/descrambler pair that removes the possibility of catastrophic error due to improper transmission of initial condition information without disrupting the OFDM modulation scheme of a system that includes error-correction coding and replay variation.

The present invention is directed to overcoming, or at least reducing the effects of one or more of the problems set forth above.

SUMMARY OF THE INVENTION

To address the above-discussed deficiencies of existing synchronous scrambling techniques, the present invention teaches a separated synchronizing scrambler/descrambler pair that removes the possibility of catastrophic error due to improper transmission of initial condition information without disrupting the OFDM modulation scheme of a system that includes error-correction coding circuitry and replay variation.

A data communication system in accordance with the present invention includes a transmitting device and a receiving device. The transmitting device includes a first and a second data scrambler coupled together. The first data scrambler couples to receive the incoming data stream and filters the incoming data stream to provide a first filtered signal using a key signal. The first data scrambler includes a first initial condition and a means for forming the key signal. The second data scrambler, having a second initial condition, couples to receive the first filtered signal from the first data scrambler and converts the first filtered signal into a scrambled signal using a scrambling seed. The second data scrambler comprises a random series generator for generating the scrambling seed to convert the first filtered signal into a scrambled signal. The scrambled signal is transmitted to the receiving device.

The receiving device includes a first and a second data descrambler for receiving a transmitted scrambled input data stream from the transmitting device. The first data descrambler couples to receive the transmitted scrambled input data stream from the transmitting device to convert the scrambled signal into a descrambled signal using a descrambling seed equivalent to the scrambling seed of the scrambler of the transmitting device. The first data descrambler comprises a random series generator for generating the descrambling seed to convert the filtered signal into a descrambled signal. The second data descrambler couples to receive the descrambled signal from the first data descrambler and filters the scrambled input data stream to provide a filtered descrambled signal using a feedforward filter and a key signal. The feedforward filter is structured in the same proportions as the feedback filter of the transmitting device. The first data descrambler includes an third initial condition equivalent to the second initial condition of the second data scrambler wherein the second initial condition is varied to implement replay variation. In addition, the second data descrambler includes a means for forming the key signal.

In packet based system, the self-synchronizing filtering of the first data scrambler may be used to provide replay variation and solve the catastrophic error propagation problem. This is particularly valuable in systems that incorporate an error-correcting code to remove errors. In this system, the initial condition of the scrambling filter can be varied to provide replay variation, and errors in the transmission of the initial condition information are limited at the receiving device by the descrambling filter of the second descrambler. A stronger connection exists between a PN-generator with a given generator polynomial, g(D), and a self-synchronizing scrambler that implements the descrambler filter as a moving average filter with the same generator polynomial, g(D). Thereby, the selection of the initial condition of the PN-generator and the initial condition of the scrambling filter has a similar effect of the replay aspect of the scrambling process. The incorporation of a variable initial condition on a synchronized scrambler can be decomposed into a nesting of an other self-synchronized scrambler with a fixed initial condition having an inner synchronized scrambler with a variable initial condition. This decomposition leads to the interesting implementation with existing data communication systems where the error propagation problem of an existing system based on a synchronized scrambler can be mitigated by the addition, at the transmitter, of a scrambling filter before the existing scrambler and, at the receiver, a descrambling filter after the existing descrambler. In this way, the self-synchronized scrambler forms a pre-coder/post-coder pair at the transmitter/receiver respectively.

This embodiment has important practical application in existing OFDM based wireless local area network (WLAN) systems such as IEEE 802.11(a) and (g) and HiperLAN-2. These systems currently incorporate synchronized scrambling with replay variation; yet, do not incorporate an error correcting codes such as a Reed-Solomon code. This present embodiment or implementation will enable such a system to add error-correction capability to the system without the need to modify the pre-existing modulation and scrambling themes and architecture. Furthermore, this implementation limits the error propagation of an error in a scrambler initial condition information which would otherwise render useless the error-correction capability.

These and other features and advantages of the present invention will be understood upon consideration of he following detailed description of the invention and the accompanying drawings.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set for the herein. Rather, these embodiments are provided so that this disclosure will be thorough and complete, and will fully convey the scope of the invention to those skilled in the art.

The present invention is best understood by comparison with the prior art. Hence, this detailed description begins with a discussion of known scrambler/descrambler pair arrangement of a synchronizing scrambler 100 shown in FIG. 1 as disclosed in U.S. Pat. No. 6,122,376. Transmit scrambler 110 is used to randomize input data streams 112. Herein, a framing pattern or other known means is used to manipulate the bits into some definable blocks of information. These bits are then exclusively OR'ed using exclusive OR units 114 and 116 with a fixed pattern of bits synchronized to the boundaries of the block. An example of a framing pattern may comprise a scrambling sequence generated from a pseudo random sequence generator 120 wherein the data to be transmitted is altered by the addition of the scrambling sequence on a symbol-by-symbol basis. Specifically, the scrambling sequence a pseudo-random number (PN) sequence generated using a seed load 118. The addition of the PN sequence to the incoming data stream is defined over a symbol set representing a finite field (FF). In the binary symbol representation, addition is defined using an exclusive-or (XOR) operation using units 114 and 116. Since a pattern of scrambling bits is fixed with respect to the block, the same pattern can be used at the receiving end 130 to unscramble the bits. Thus, descrambling occurs at the receiving side 130 using the PN sequence which was employed at the transmitting side 110. Specifically, the scrambled signal sent by antenna 122 is received by antenna 132. Those skilled in the art should recognize that a communication channel may not include an antenna yet a variety of numerous coupling means i.e. fiber optics. Noise 124 within the medium whereby the transmitted signal is sent may cause errors and thereby corruption of data. Thus, a pseudo-random number (PN) sequence generator 144 uses a seed load 140 to generate a descrambling sequence to descramble the incoming data stream. The addition of the PN sequence to the incoming data stream is defined over a symbol set representing a finite field (FF). In the binary symbol representation, addition is defined using an exclusive-or (XOR) operation using units 134 and 138.

Figure 1:
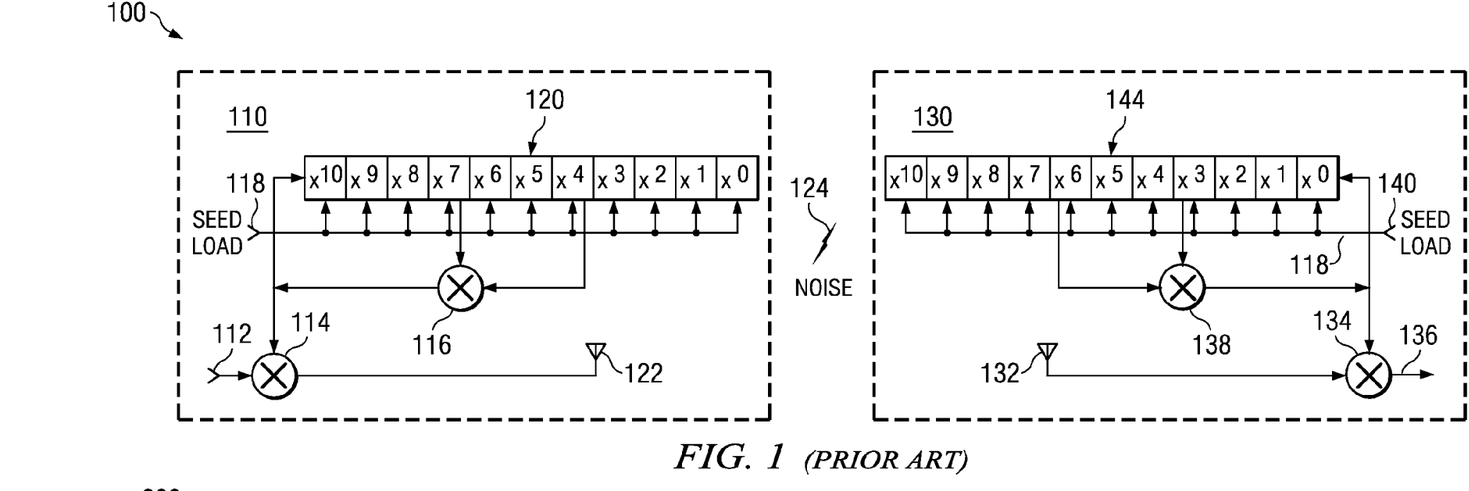
FIG. 1 shows a scrambling/descrambling arrangement of a known synchronizing scrambler.

Any bit error occuring in the transmission channel between the transmitter and the receiver will cause an error in that particular bit, but will not cause other bits to be in error, provided only that the receiver remains synchronized with the transmitter given the block boundaries. Thus, synchronized scrambling is beneficial in that it does not propagate transmission errors. The requirement that the transmitted scrambling sequence and the received scrambling sequence be synchronized, however, proves to be a disadvantage. Particularly, in systems that allow replay variation, since replay variation entails that transmission of identical data on two separate occasions will likely result in different sequences of transmission symbols.

Figure 2:
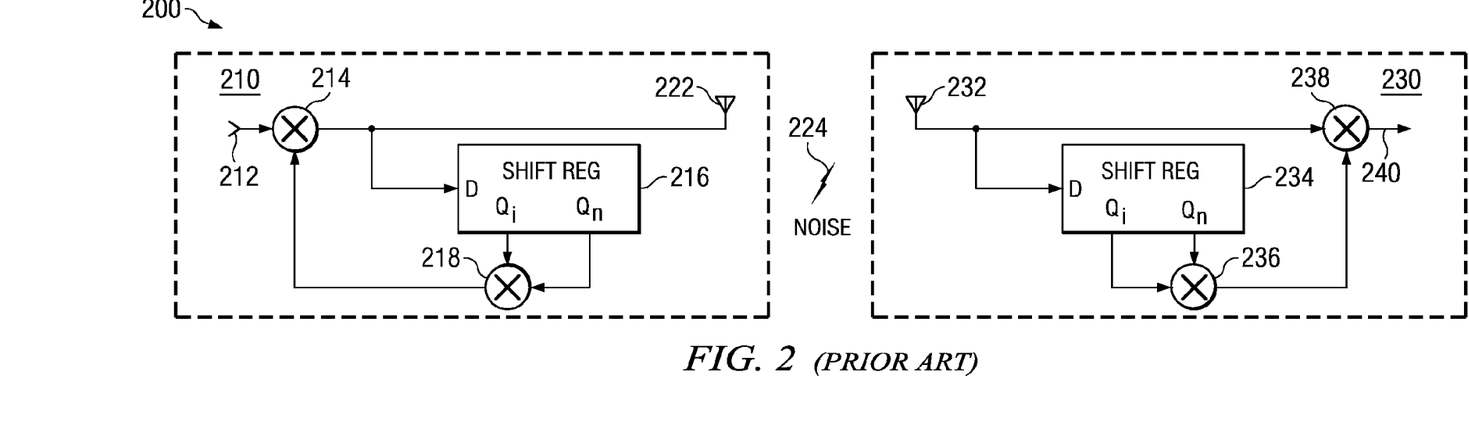
FIG. 2 displays a scrambling/descrambling arrangement of a known self-synchronizing scrambler.

FIG. 2 is a scrambler/descrambler pair arrangement of a self-synchronizing scrambler 200 as disclosed in U.S. Pat. No. 5,530,959. An incoming data stream couples to input 212 of transmit side 210. As shown, these bits at the transmitting end 210 of a communication channel are to be scrambled by passing them through a scrambling feedback filter structure at the transmitter 210. More particularly, the bits at the transmitting end 210 of a communication channel to be scrambled are passed through one input of a two input exclusive OR gate 214. The output of the gate 214 is the output 222 of the scrambler 210 and also the input to an N-stage shift register 216 which provides the feedback filter structure. This shift register 216 is tapped at the Nth stage and/or one or more other stages as shown, and the outputs of these taps are exclusively OR'ed together at unit 218. The result of this exclusive OR operation is applied to the other input of the exclusive OR gate 214. The tap positions are chosen such that a polynomial represented by the tap weight is irreducible. This is also known as a primitive polynomial.

The scrambled bits received at the receiving end 230 of the communication channel to be descrambled are passed through a descrambling feedforward filter structure at the receiver 230. More particularly, the bits at the receiving end 230 of a communication channel to be descrambled are passed through one input of a two input exclusive OR gate 238. The bits at the receiving end of the communcation channel to be descrambled are also passed through an N-stage shift register 234 which provides a feedforward filter structure. This shift register 234 is tapped at the Nth stage and/or one or more other stages as shown, and the outputs of these taps are exclusively OR'ed together at unit 236. The tap positions of the N-stage shift register are chosen such that the tap weights represent the same primitive polynomial of the feedback filter structure at the transmitting end of the communication channel. The result of this exclusive OR operation is applied to the other input of the exclusive OR gate 238 that has the data to be descrambled as the first input. The result of this exclusive OR provides the output of the descrambler.

The feedback and feedforward filters are typically linear, time-invariant filters over the FF. The descrambling filter is required to operate on a sliding window of the received symbol sequence. For a linear descrambling filter, the output at any given time is a linear combination of the received symbols within the sliding window. Such a filter is commonly known as a moving average or finite impulse response (FIR) filter. The feedback-free constraint of the descrambling filter implies that a transmission error can affect the descrambler output only during the time that the error is within the window of the filter. Thus, self-synchronizing scrambling provides limited error propagation in that the possibility exists that an error can affect the descrambler output while it is within the window of the filter. The length of the descrambling window, however, limits the span of the possible error propagation. Thereby, self-synchronizing scrambling is advantageous in that the limited effect of an error exists when the descrambling filter has knowledge of the state of the scrambling filter.

One disadvantage of self-synchronizing scrambling is the limited error propagation that results from the fact that an error can affect the descrambler output while it is within the window of the filter. Note that the length of the descrambling window limits the span of the possible error propagation. An advantage of self-synchronizing scrambling is the limited effect of an error in the knowledge of the state of the scrambling filter, at the transmitter, on the de-scrambling process, at the receiver. It is this fact that is useful to used self-synchronizing scrambling with replay variation and motivates the current invention.

In frame or packet based communications systems, such as systems in compliance with IEEE Standard 802.11 and HiperLAN WLANs, information that is to be transmitted is sent in fixed or variable length blocks with boundaries that synchronize at the transmitter and receiver. Synchronized scramblers are used to perform packet synchronization processing and guarantee the synchronization of the scrambling sequence generators. In systems that provide replay variation, however, it is not best to use the synchronized scrambler as previously described.

In a self-synchronizing scrambler, replay variation is implemented by varying the initial condition or value of the state of the scrambling sequence generator at the beginning of the packet. In order to properly descramble the data at the receiver, the initial condition of the scrambling sequence generator must be conveyed to the receiver. As such, information about the initial condition used by the transmitter is transmitted as an extra part of the packet. An error, however, may occur in the transmission of the initial condition information. This can lead to un-bounded (i.e. catastrophic) error propagation that corrupts the entire packet. In a system where any detected error in a packet results in rejection of the entire packet, the catastrophic error propagation problem will not have an effect upon the reliability of data transmission. However, if the data is protected by an error-correcting code, such as a Reed-Solomon code, the catastrophic error propagation will usually overload the error correcting capabilities of the code and render the error-correction mechanism useless.

In summary, frame-based scrambling as shown FIG. 1 comprises adding a pseudo-random sequence into a data stream and then descrambling by subtracting the same sequence at the receiver. This technique produces no error propagation but if the initialization of the scrambler and descrambler are different catastrophic errors will result. Self-synchronizing scrambling as shown in FIG. 2 comprises passing the data through a feedback filter structure and descrambling by passing the received sequence through the same filter structure in a feed-forward manner. This technique suffers from error propagation proportional to the number of filter taps but an error in the initialization of the scrambler and descrambler is not catastrophic since the descrambling structure is reset by the incoming data.

Figure 3:
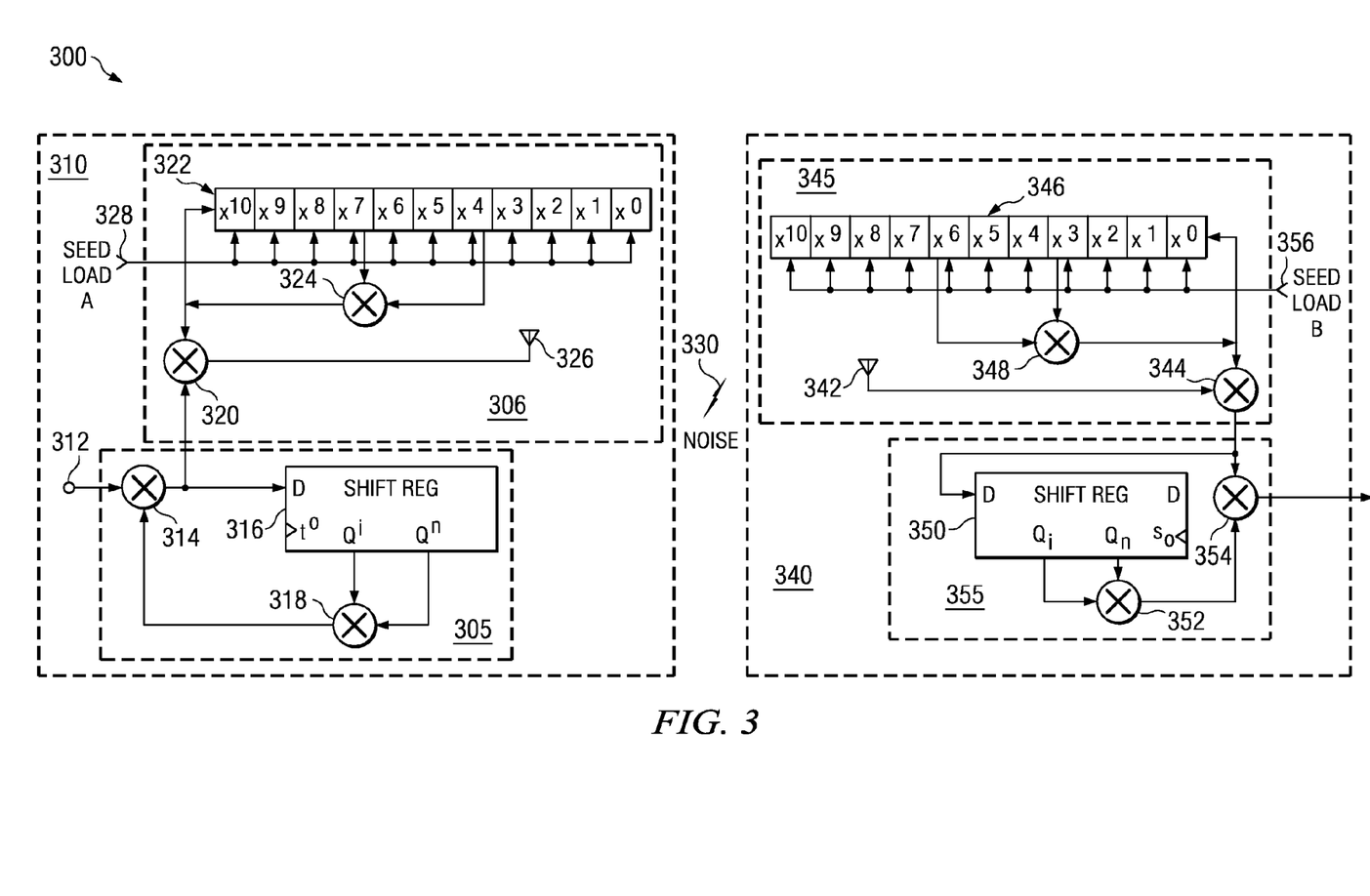
FIG. 3 illustrates a scrambling/descrambling arrangement of a separated synchronizing scrambler in accordance with the present invention.

FIG. 3 illustrates the scrambler/descrambler pair arrangement 300 of the separated synchronizing scrambler in accordance with the present invention. The data communication system includes a transmitting device 310 and a receiving device 340. The transmitting device 310 includes a first and a second data scrambler, 305 and 306, coupled together. The first data scrambler 305 couples to receive the incoming data stream 312 and filters the incoming data stream to provide a first filtered signal using a key signal. The first data scrambler 305 includes a first initial condition and a means for forming the key signal. The second data scrambler 306 couples to receive the first filtered signal from the first data scrambler 305 and converts the first filtered signal into a scrambled signal using a scrambling seed 328. The second data scrambler 306 comprises a random series generator 322 for generating the scrambling seed to convert the first filtered signal into a scrambled signal. The second data scrambler 306 has a second initial condition. The scrambled signal along with the first and second initial condition information is transmitted to the receiving device 340.

More particularly, the first data scrambler 305 receives an incoming data stream couples to input 312 of transmit side 310. As shown, these bits at the transmitting end 310 of a communication channel are to be scrambled by passing them through a scrambling feedback filter structure at the transmitter 310. More particularly, the bits at the transmitting end 310 of a communication channel to be scrambled are passed through one input of a two input exclusive OR gate 314. The output of the gate 314 is the output of the scrambler 305 and also the input to an N-stage shift register 316 which provides the feedback filter structure. This shift register 316 is tapped at the Nth stage and/or one or more other stages as shown, and the outputs of these taps are exclusively OR'ed together at unit 318. The result of this exclusive OR operation is applied to the other input of the exclusive OR gate 314. The tap positions are chosen such that a polynomial g(D) represented by the tap weight is irreducible. This is also known as a primitive polynomial g(D) to be explained in detail hereinafter.

The second data scrambler 306 manipulates the filtered bits received by the first data scrambler 306 into some definable blocks of information. These bits are exclusively OR'ed using exclusive OR units, 320 and 324, with a fixed pattern of bits synchronized to the boundaries of the block. Pseudo random sequence generator 322 generates a scrambling sequence using the scrambling seed 328 wherein the data to be transmitted is altered by the addition of the scrambling sequence on a symbol-by-symbol basis. The tap positions of pseudo random sequence generator 322 are chosen such that a polynomial g(D) represented by the tap weight is irreducible. This is also known as a primitive polynomial g(D). The addition of the PN sequence to the incoming data stream is defined over a symbol set representing a finite field (FF). In the binary symbol representation, addition is defined using an exclusive-or (XOR) operation using units, 320 and 324.

The receiving device 340 includes a first and a second data descrambler, 345 and 355, for receiving a transmitted scrambled input data stream from the transmitting device. The first data descrambler 345 couples to receive the transmitted scrambled input data stream from the transmitting device 310 to convert the scrambled signal into a descrambled signal using a descrambling seed 356 equivalent to the scrambling seed 328 of the scrambler of the transmitting device. The first data descrambler 345 comprises a random series generator 346 for generating the descrambling seed 356 to convert the filtered signal into a descrambled signal. The initial condition of the first data descrambler 345 is set to the same initial condition of the second data scrambler 322. The second data descrambler 355 couples to receive the descrambled signal from the first data descrambler 345 and filters the scrambled input data stream to provide a filtered descrambled signal using a feedforward filter and a key signal. The feedforward filter 350 is structured in the same proportions as the feedback filter 316 of the transmitting device 310. The second data descrambler 355 includes an second initial condition equivalent to the first initial condition of the first data scrambler. In addition, the second data descrambler 355 includes a means for forming the key signal.

The first data descrambler 345 uses the same pattern of the second data scrambler to descramble the incoming transmitted bit stream, since a pattern of scrambling bits is fixed with respect to the block. Thus, descrambling occurs at the receiving side 340 using the PN sequence which was employed at the transmitting side 310. Specifically, the scrambled signal sent by antenna 326 is received by antenna 342. Those skilled in the art should recognize that a communication channel may not include an antennas, 326 and 342; yet, a variety of numerous coupling means may be employed i.e. fiber optics. Noise 330 within the medium whereby the transmitted signal is sent may cause errors and thereby corruption of data. Thus, a pseudo-random number (PN) sequence generator 346 uses a seed load 356 to generate a descrambling sequence to descramble the incoming data stream. The tap positions of pseudo random sequence generator 346 are chosen such that a polynomial g(D) represented by the tap weight is irreducible. This is also known as a primitive polynomial g(D).). The addition of the PN sequence to the incoming data stream is defined over a symbol set representing a finite field (FF). In the binary symbol representation, addition is defined using an exclusive-or (XOR) operation using units, 344 and 348.

The second data descrambler 355 couples to receive the descrambled bit stream to further filter errors out of the data. Specifically, the second data descrambler 355 receives an incoming data stream from exclusive OR unit 344. As shown, these bits are to be filtered by passing them through a descrambling feedforward filter structure 350 In addition, these bits are forwarded to one input of two-input exclusive OR unit 354. N-stage shift register 350 which provides the feedforward filter structure and is tapped at the Nth stage and/or one or more other stages as shown, and the outputs of these taps are exclusively OR'ed together at unit 352. The result of this exclusive OR operation is applied to the other input of the exclusive OR gate 354. The tap positions are chosen such that a polynomial g(D) represented by the tap weight is irreducible. This is also known as a primitive polynomial g(D).

The initial condition of the second data scrambler 306 can be varied to provide replay variation and errors in the transmission of the initial condition information are limited at the receiver by the second data descrambler 355. A strong connection exists between a PN-generator in the second data scrambler 306 having a given generator polynomial, g(D), and the second descrambler 355 that implements the descrambler filter as an moving average filter having the same generator polynomial, g(D). Thus, one may verify that the selection of the initial condition of the PN-generator of the second data scrambler 306 or the initial condition of the scrambling filter 355 both have a similar effect of the replay aspect of the scrambling process.

The incorporation of a variable initial condition on transmitting device 310 can be decomposed into a nesting of an outer self-synchronized scrambler 305 having a fixed initial condition with an inner synchronized scrambler 306 having a variable initial condition.

The present embodiment may be implemented in existing OFDM based wireless local are network (WLAN) systems such as IEEE Standard 802.11(a) and (g) and HIPERLAN-2 to mitigate the error propagation problem. The implementation comprises the addition of a self-synchronizing scrambling filter before the existing synchronizing scrambler at the transmitting side and the addition of a self-synchronizing descrambling filter after a synchronizing descrambler at the receiving side. In this way, the self-synchronized scrambler forms a pre-coder/post-coder pair at the transmitter/receiver pair, respectively. These systems include synchronized scrambling with replay variation; yet, currently do not incorporate an error correcting code such as a Reed-Solomon code. As such, given the incorporation of the present embodiment error-correction capability may be incorporated in one of such existing systems without the need to modify the pre-existing scrambling and modulation scheme. As a further advantage, the implementation will limit the error propagation of an error in the scrambler initial condition information.

With further reference to second data descrambler 355, consider a generator polynomial of degree n $$g(D) = g_0 + g_1 D + g_2 D^2 + \ldots + g_n D^n$$

where the coefficients are members of the FF (i.e., 0's and 1's in the binary case), $g_n \neq 0$ and (without loss in generality) $g_0=1$. Such a polynomial defines an moving average filter 355 with input sequence $\{z_j\}$ and output sequence $\{y_j\}$ defined by the equations $$y_j = z_j + g_1 z_{j-1} + \ldots + g_n z_{j-n} = z_j + \sum_{k=1}^{n} g_k z_{j-k}$$

Note that the state of the filter at the time j, the n-tuple $$s_j = (z_{j-1}, z_{j-2}, \ldots z_{j-n})$$

is a sliding-widow function of only the input. The output at time j, where $y_j$ is a function of the state $s_j$ and the input $z_j$. The input to output relationship for this filter is denoted by $z \Rightarrow [g(D)] \Rightarrow y$. Furthermore, if the input to the filter is zero, $z_j=0$, for $j \geq 0$, then the output will always go to zero, $y_j=0$, for $j \geq n$ independent of the initial value for the state of the filter at the time j, $$s_0 = (z_{-1}, z_{-2}, \ldots, z_{-n})$$

Those skilled in the art should recognize that there are many ways to implement a moving average filter 355 for a given generator polynomial g(D). The definition of the state depends on whether the particular implementation has the same finite response to the initial condition.

The generator polynomial, g(D), also defines a recursive filter that is infinite impulse response (IIR). The recursive filter, implemented as the first data scrambler 305, can be realized by the equations $$z_j = x_j - g_1 z_{j-1} - \ldots - g_n z_{j-n} = x_j - \sum_{k=1}^{n} g_k z_{j-k}$$

For this implementation, the state of the filter at the time j, the n-tuple $$t_j = (z_{j-1}, z_{j-2}, \ldots, z_{j-n})$$

is a sliding window function of the output and the output at time j, $z_j$, is a function of the state, $t_j$, and the input, $z_j$. The input to output relationship for this filter is denoted by $x \Rightarrow [1/g(D)] \Rightarrow z$. Unlike a FIR filter, for an IIR filter, if the input to the filter is zero, $x_j = 0$, for $j \geq 0$, then the output will usually not go to zero, $z_j = 0$, for $j \geq n$ independent of the initial value for the state of the filter at the time j, $$t_0 = (z_{-1}, z_{-2}, \ldots, z_{-n})$$

One exception is the $t_0 = 0$ state which, for an all 0's input, produces an all 0's output.

Those skilled in the art should recognize that there are many ways to implement a recursive filter with a given generator polynomial g(D). The definition of the state depends on the particular implementation. Nonetheless, all implementations have the same infinite response to the initial condition.

It is the infinite response to the initial condition that makes the recursive filter an ideal method for generating a PN-sequence. To generate such a sequence, a recursive filter is initialized with a non-zero value, $t_0 \neq 0$, a zero-valued input sequence, $x_j = 0$, is applied and the output sequence $\{z_j\}$ is the "random" PN-sequence. The PN-sequence produced will be a periodic sequence, with a large period if the generator is chosen judicially. The period is maximized if the generator is a primitive polynomial. Such polynomials exist for all FFs and all degrees n>0[1]. In the binary case, the period of the sequence is $2^n - 1$ where n is the degree (in general the period is $|FF|^n - 1$). An example of a binary primitive polynomial with degree 7 is $g(D) = 1 + D^4 + D^7$ as is shown in FIG. 3.

Given generator g(D), the set of all PN-sequences produced by choosing an initial condition $t_0$ and applying a zero input forms a vector space. This means that the set of PN-sequences is closed under linear combination. For example, the difference between any two PN-sequences produced by the PN-generator is itself a PN-sequence produced by the PN-generator.

The recursive and moving average filters, 305 and 355, are inverses to each other in the following sense. If filters are cascaded, with the output of the recursive filter 305 used as the input to the moving average filter $x \Rightarrow [1/g(D)] \Rightarrow [g(D)] \Rightarrow y$, and if the initial conditions $s_0$ and $t_0$ are matched, then the output of the moving average filter 355 will equal the input to the recursive filter 305, $y_j = x_j$ for all $j \geq 0$. There is a one-to-one correspondence or "match" between a given initial condition $t_0$ and a matching $s_0$ such that this is true. Whether or not the initial conditions match, however, the output of the moving average filter 355 will equal the input to the recursive filter, $y_j = z_j$ for all $j \geq n$, the degree of g(D). Thus, if the states match, then the moving average filter 355 is the inverse to the recursive filter 305 for all time $j \geq 0$. Nevertheless, even if the states do not match, then the moving average filter 355 will invert the recursive filter 305 after the first n steps, $j \geq n$.

The conventional to scramble a packet transmission system with replay variation is to select an initial condition $t_0$ for a PN-generator and add the produced PN-sequence to the data portion of the packet producing the scrambled data. The value of initial condition $t_0$ is transmitted along with the scrambled data. At the receiver, the value of initial condition $t_0$ is detected and used to initialize a PN-generator. The resulting PN-sequence is subtracted from the detected scrambled data to perform the de-scrambling function. If there are no errors in the detection of the initial condition $t_0$, then the descrambling function introduces no error propagation in the detected data. If, however, there is an error in the transmission of the initial condition $t_0$, then this error corrupts the scrambling function. In fact, the descrambled data will exhibit a difference between the PN-sequence produced at the transmitter and that produced at the receiver which is added to the transmitted signal. If the difference is 0 in the case where no error exists in the transmission of initial condition $t_0$, then the result is the desired effect. When the difference is non-zero, however, then the added difference is a non-zero PN-sequence which is a periodic, non-zero sequence. Thus, conventionally, the error in transmitting initial condition $t_0$ produces a host of errors in the detected data.

The embodiment in accordance with the present invention scrambles a packet transmission system with replay variation by selecting an initial condition $t_0$ for a recursive filter 305 and taking the data portion of the packet as the input to filter producing scrambled data as the filter output. The value of initial condition $t_0$ is transmitted along with the scrambled data. At the receiver, the value of initial condition $t_0$ is detected and used to initialize a moving average filter 355 with the matching initial condition $s_0$. The information transmitted need not be initial condition $t_0$ itself, but any description that specifies initial condition $s_0$ such as initial condition $s_0$ itself. The moving average filter 355 is initialized with initial condition $s_0$ and the detected scrambled data is applied to the input producing the de-scrambling data. If there are no errors in the detection of the initial condition $s_0$, then the descrambling function introduces no error propagation in the detected data. If however, there is an error in the transmission of the initial condition $s_0$, then this error corrupts the scrambling function only for a limited time of within the first n symbols. Thus, in this case, the error in transmitting initial condition $s_0$ produces only a small number of errors in the detected data.

Scrambler 310 and descrambler 340 each may be decomposed into two components, one that is a function of only the data to be scrambled and one that only involves the choice of initial condition. In fact, scrambler 310 can be implemented as the cascade of a recursive filter 305 with a fixed initial condition followed by the addition of a PN-sequence 306. Similarly, descrambler 340 can be implemented as the cascade of the addition of a PN-sequence 345 followed by a moving average filter 355 with a matching initial condition wherein it is matched to the fixed initial condition of the recursive filter 305. For a fixed data sequence, the set of signals produced by varying the initial condition of the recursive filter is the same as the set of signals produced with a fixed initial condition followed by the addition of a PN-sequence from a PN-generator with the same generator polynomial g(D). There are $2^n$ possible selections for varying the initial condition in the binary case Consider a data communication system having PN-generator scrambling with replay variation as previously described. This system will be susceptible to catastrophic error propagation when an error occurs in the transmission of the initial condition of the PN-generator. This catastrophic error propagation problem, however, may be mitigated by "pre-coding" the data before the scrambler with a recursive filter with a fixed initial condition using the same generator g(D) as the PN-generator. In the alternative, the data is "post-coded" after the de-scrambler using a moving average filter with an initial condition matched to the pre-coder and the same generator g(D).

This latter invention has immediate application to systems such as those designed to follow the IEEE 802.11 and HiperLAN WLANs. These systems scramble data with replay variation using a PN-generator with $g(D)=1+D_4+D_7$. The error propagation issue in the transmission of the initial condition is a real concern since there is a desire to add Reed-Solomon coding to the specification. This invention is an important tool in making such addition viable.

Advantages of this design include but are not limited to an efficient separated synchronizing scrambler/descrambler pair that removes the possibility of catastrophic error due to improper transmission of initial condition information without disrupting the OFDM modulation scheme of a system that includes error-correction coding circuitry and replay variation.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claim:

1. A separated self-synchronizing packet-based scrambler, comprising:
   a first data scrambler for receiving an input data stream and filtering the input data stream into a filtered signal using a feedback filter and a key signal, the first data scrambler having a first initial condition and including a means for forming the key signal; and
   a second data scrambler coupled to said first data scrambler to receive the filtered signal from the first data scrambler and to convert the filtered signal into a scrambled signal using a scrambling seed, the second data scrambler, having a second initial condition, comprising a random series generator for generating the scrambling seed for converting the filtered signal to a scrambled signal.

2. A separated self-synchronizing packet-based scrambler as recited in claim 1, wherein the random series generator is a pseudo noise code generator.

3. A separated self-synchronizing packet-based scrambler as recited in claim 2, wherein the pseudo noise code generator uses a primitive polynomial to generate the scrambling seed.

4. A separated self-synchronizing packet-based scrambler as recited in claim 1, wherein the coupling of the first and second data scramblers allow a receiver to automatically correct errors in a packet-based data communication system that includes error coding and wherein the second initial condition is varied in the second data scrambler to provide replay variation and the first initial condition of the first data scrambler is fixed.

5. A separated self-synchronizing packet-based scrambler as recited in claim 4, wherein the error coding is generated by a Reed-Solomon coder circuit.

6. A separated self-synchronizing packet-based scrambler as recited in claim 4, wherein the packet-based data communication system is a packet-based orthogonal frequency division modulation (OFDM) data communication system implemented in a wireless local area network (WLAN) in compliance with IEEE standard 802.11.

7. A separated self-synchronizing packet-based scrambler as recited in claim 4, wherein the packet-based data communication system is a packet-based orthogonal frequency division modulation (OFDM) data communication system implemented in a wireless local area network (WLAN) in compliance with High Performance Local Area Network (HiperLAN) standards.

8. A separated self-synchronizing packet-based descrambler, comprising:
   a first data descrambler for receiving a transmitted scrambled input data stream from a transmitter and to convert the scrambled signal into a descrambled signal using a descrambling seed equivalent to the scrambling seed of the scrambler of the transmitter, the first data descrambler having a first initial condition, comprising a random series generator for generating the descrambling seed for converting the scrambled signal to a descrambled signal; and
   a second data descrambler coupled to said first data descrambler to receive the descrambled signal from the first data scrambler and to filter the input data stream into a filtered descrambled signal using a feedforward filter and a key signal, the second data descrambler having a second initial condition equivalent to the initial condition of the scrambler in the transmitter and the second data descrambler including a means for forming the key signal.

9. A separated self-synchronizing packet-based descrambler as recited in claim 8, wherein the random series generator is a pseudo noise code generator.

10. A separated self-synchronizing packet-based descrambler as recited in claim 9, wherein the pseudo noise code generator uses a primitive polynomial to generate the descrambling seed.

11. A separated self-synchronizing packet-based descrambler as recited in claim 8, wherein the coupling of the first and second data descramblers allow a receiver to automatically correct errors in a packet-based data communication system that includes error coding and wherein the first initial condition of the first data descrambler is varied to provide replay variation and the second initial condition of the second data descrambler is fixed.

12. A separated self-synchronizing packet-based descrambler as recited in claim 11, wherein the error coding is generated by a Reed-Solomon coder circuit.

13. A separated self-synchronizing packet-based descrambler as recited in claim 11, wherein the packet-based data communication system is a packet-based orthogonal frequency division modulation (OFDM) data communication system implemented in a wireless local area network (WLAN) in compliance with IEEE standard 802.11.

14. A separated self-synchronizing packet-based scrambler as recited in claim 11, wherein the packet-based data communication system is a packet-based orthogonal frequency division modulation (OFDM) data communication system implemented in a wireless local area network (WLAN) in compliance with High Performance Local Area Network (HiperLAN) standards.

15. A packet-based data communication system having a transmitting device and a receiving device, wherein the transmitting device includes:
    a first data scrambler for receiving an input data stream and filtering the input data stream into a first filtered signal using a key signal, the first data scrambler having a first initial condition and including a means for forming the key signal, and
    a second data scrambler coupled to said first data scrambler to receive the first filtered signal from the first data scrambler and to convert the first filtered signal into a scrambled signal using a scrambling seed, the second data scrambler, having a second initial condition, comprising a random series generator for generating the scrambling seed for converting the first filtered signal to a scrambled signal; and
wherein the receiving device includes:
    a first data descrambler for receiving the transmitted scrambled input data stream from the transmitting device and to convert the scrambled signal into a descrambled signal using a descrambling seed equivalent to the scrambling seed of the scrambler of the transmitting device, the first data descrambler, having a third initial condition equivalent to the second initial condition, comprising a random series generator for generating the descrambling seed for converting the scrambled signal to a descrambled signal; and
    a second data descrambler coupled to said first data descrambler to receive the descrambled signal from the first data scrambler and to filter the input data stream into a filtered descrambled signal using a feedforward filter and a key signal, the second data descrambler having an fourth initial condition equivalent to the first initial condition of the first data scrambler in the transmitting device and the second data descrambler including a means for forming the key signal.

16. A separated self-synchronizing packet-based scrambler as recited in claim 15, wherein the random series generator is a pseudo noise code generator.

17. A separated self-synchronizing packet-based scrambler as recited in claim 15, wherein the pseudo noise code generator uses a primitive polynomial to generate the scrambling seed and the descrambling seed.

18. A separated self-synchronizing packet-based scrambler as recited in claim 17, wherein the coupling of the first and second data scramblers allow a receiving device to automatically correct errors in a packet-based data communication system that includes error coding, wherein the second initial condition and the third initial condition are varied to provide replay variation and wherein the first initial condition and the fourth initial condition are fixed.

19. A separated self-synchronizing packet-based scrambler as recited in claim 18, wherein the error coding is generated by a Reed-Solomon coder circuit.

20. A separated self-synchronizing packet-based scrambler as recited in claim 18, wherein the packet-based data communication system is a packet-based orthogonal frequency division modulation (OFDM) data communication system implemented in a wireless local area network (WLAN) in compliance with IEEE standard 802.11.

21. A separated synchronizing scrambler as recited in claim 18, wherein the packet-based data communication system is a packet-based orthogonal frequency division modulation (OFDM) data communication system implemented in a wireless local area network (WLAN) in compliance with High Performance Local Area Network (HiperLAN) standards.

* * * * *